United States Patent [19]

Hattori et al.

[11] Patent Number: 5,007,514
[45] Date of Patent: Apr. 16, 1991

[54] RETAINER FOR ONE-WAY CLUTCH

[75] Inventors: Tsuneichi Hattori, Fukuoka; Kazuo Iga, Nara, both of Japan

[73] Assignee: Koyo Seiko Co., Ltd., Osaka, Japan

[21] Appl. No.: 483,202

[22] Filed: Feb. 20, 1990

[30] Foreign Application Priority Data

Feb. 22, 1989 [JP] Japan ................ 1-20126[U]

[51] Int. Cl.⁵ .............................................. F16D 3/34
[52] U.S. Cl. ................................. 192/45; 192/41 A; 188/82.84; 267/163
[58] Field of Search ................. 192/45, 44, 41 A; 188/82.84; 267/158, 163, 164

[56] References Cited

U.S. PATENT DOCUMENTS

| | | | |
|---|---|---|---|
| 3,184,020 | 5/1965 | Benson et al. | 192/45 |
| 3,260,333 | 7/1966 | Benson et al. | 192/45 |
| 3,500,977 | 3/1970 | Gehrke | 192/45 |
| 3,537,555 | 11/1970 | Reister | 192/45 |
| 3,863,742 | 2/1975 | Elmore et al. | 192/45 |
| 4,404,760 | 10/1968 | Benson et al. | 192/45 |
| 4,556,567 | 1/1986 | Miyatake | 192/45 |

Primary Examiner—Allan D. Herrmann
Assistant Examiner—Andrea Pitts
Attorney, Agent, or Firm—Mason, Fenwick & Lawrence

[57] ABSTRACT

A retainer which is for a one-way clutch and is made of a synthetic resin so that the retainer includes a pair of annular portions, a plurality of column portions disposed at equal intervals along the circumference of the retainer and coupling the annular portions to each other along the axis of the retainer, roller pockets defined by the annular portions and the column portions, and elastic members integrally provided on the sides of the column portions, to which rollers housed in the roller pockets are moved when the one-way clutch is disengaged. The other side of each of the column portions is formed with an inner and an outer projecting parts projecting toward the former side of the neighboring column portion. The width of each of the elastic members gradually decreases from the butt thereof toward the tip thereof. The former side of each of the column portions is formed with stoppers for limiting the elastic deformation of the elastic members toward the former side of the column portion.

With this construction, the plastic deformation of the elastic member is avoided for a long period of time and the process and equipment for manufacturing the retainer can be made more rational and less expensive than those for the conventional retainer.

6 Claims, 4 Drawing Sheets

RETAINER FOR ONE-WAY CLUTCH

BACKGROUND OF THE INVENTION

The present invention relates to a retainer for a one-way clutch of the roller type, more particularly to a retainer made of a synthetic resin so as to prevent rollers from falling off out of the pockets of the retainer either inward or outward in the radial direction of the retainer.

A conventional retainer for a one-way clutch was disclosed in the U.S. Pat. No. 3,260,333. The retainer is made of a synthetic resin, and includes a pair of annular portions located at a distance from each other in the axial direction of the retainer, a plurality of column portions disposed at equal intervals along the circumference of the retainer and coupling the annular portions to each other along the axis of the retainer, and elastic finger members which are springs integrally provided on the sides of the column portions, toward which rollers housed in roller pockets defined by the annular portions and the bridges are moved when the one-way clutch is disengaged. Both the elastic finger members on each of the column portions extend from their proximal ends on the column portion to their distal end tips in the form of V. The rollers housed in the roller pockets are pushed, by the tips of the elastic members, toward the opposite sides of the bridges, which are located opposite the former sides thereof, on which the elastic finger members are provided. The width of each of the elastic finger members is nearly uniform from their proximal ends to their distal ends. Pads are provided on the obverse and reverse sides of each of the elastic finger members at the distal end tip thereof so that the thickness of the tip is larger than that of the other part of the elastic finger member. The step of a central boss at the proximal ends of both the elastic finger members and an overhang provided on the inner part of the side of the column portion, toward which the roller housed in the roller pocket is moved when the one-way clutch is engaged, prevent the roller from falling off out of the pocket inward in the radial direction of the retainer. When the one-way clutch is disengaged, the rollers are moved toward the sides of the column portions, on which the elastic finger members are provided. At that time, both the elastic finger members are elastically deformed toward the sides of the column portions by the rollers, and the pads provided on the elastic finger members at the tips thereof limit the displacement of the rollers and the elastic deformation of the elastic finger members to reduce the stress of the elastic finger members elastically deformed. Since the elastic finger members need to be prevented from being plastically deformed, the pads are provided on the distal end tips of the elastic finger members to limit the elastic deformation of the elastic finger members to reduce the stress thereof. However, since the elastic finger members and the pads are small in size if the one-way clutch is a compact one, it is difficult to process molding dies so as to create the elastic finger members and the pads and it is necessary to very carefully separate the dies from the molded retainer. Consequently, the process and equipment for manufacturing the retainer are complicated and expensive.

SUMMARY OF THE INVENTION

The present invention was made in order to solve the above-mentioned problem.

Accordingly, it is an object of the present invention to provide a retainer which is for a one-way clutch and is made of a synthetic resin so that the retainer includes a pair of annular portions, a plurality of column portions disposed at equal intervals along the circumference of the retainer and coupling the annular portions to each other along the axis of the retainer, roller pockets defined by the annular portions and the column portions, and elastic finger members integrally provided on a first or front side of each of the column portions having outer ends against which rollers housed in the roller pockets are moved when the one-way clutch is disengaged. The other side of each of the column portions comprises a second or rear side having a radially inwardly positioned projecting part and a radially outwardly positioned projecting part both of which project into the roller pocket toward the first side of the next adjacent neighboring column portion. The width of each of the elastic finger members gradually decreases from its proximal end at its juncture with its respective supporting column toward its distal end. The first or front side of each of the column portions is formed with two stops for limiting the elastic deformation of the elastic finger members toward the first or front side of the column portion. A shaft is inserted through the retainer which is fitted in the casing of the one-way clutch. When the shaft is rotated in the direction from the first side of each column portion toward the second side of the neighboring column portion, the rollers are rolled into contact with camming surfaces formed in the concavities of the casing by both the rotating force of the shaft and the elastic force of the finger members so that the rollers become unrotatably pinched between the shaft and the camming surfaces due to a wedge effect. As a result, the shaft and the casing are rotated together. When the shaft is rotated in the reverse direction from the second side of each column portion toward the first side of the neighboring column portion, the rollers are rolled to the larger-curvature surfaces of the concavities of the casing while elastically deforming the elastic finger members toward the first sides of the column portions, so that the rollers become freely rotatable between the shaft and the concavity. As a result, the connection through the roller to the casing is terminated and only the shaft rotates.

When the rollers have become freely rotatable between the shaft and the concavities so that the casing is not rotated as discussed above, the elastic finger members are elastically deformed toward the first sides of the column portions and stopped by the stops on the first sides so that the elastic deformation of the elastic finger members is limited. Besides, since the width of each of the elastic finger members decreases progressively from the proximal end of each elastic finger member toward the distal end thereof and the distal end thereof and the tip is put in either line contact or surface contact with the roller to reduce the force on the elastic member to diminish the stress thereof, the plastic deformation of the elastic finger member is avoided for a long period of time even if the engagement and disengagement of the one-way clutch are frequently repeated.

Since the construction of the retainer is simpler than that of the conventional retainer, molding dies for manufacturing the retainer from the synthetic resin can be more easily produced and used than those for the conventional container and do not need to be separated from the molded retainer so carefully as those for the conventional retainer. Therefore, the process and equipment for manufacturing the retainer can be constructed and used both more easily and less expensively than those for the conventional retainer.

DETAILED DESCRIPTION OF EXEMPLARY EMBODIMENT

An embodiment of the present invention is hereafter described in detail with reference to the drawings attached hereto.

Figure 1:
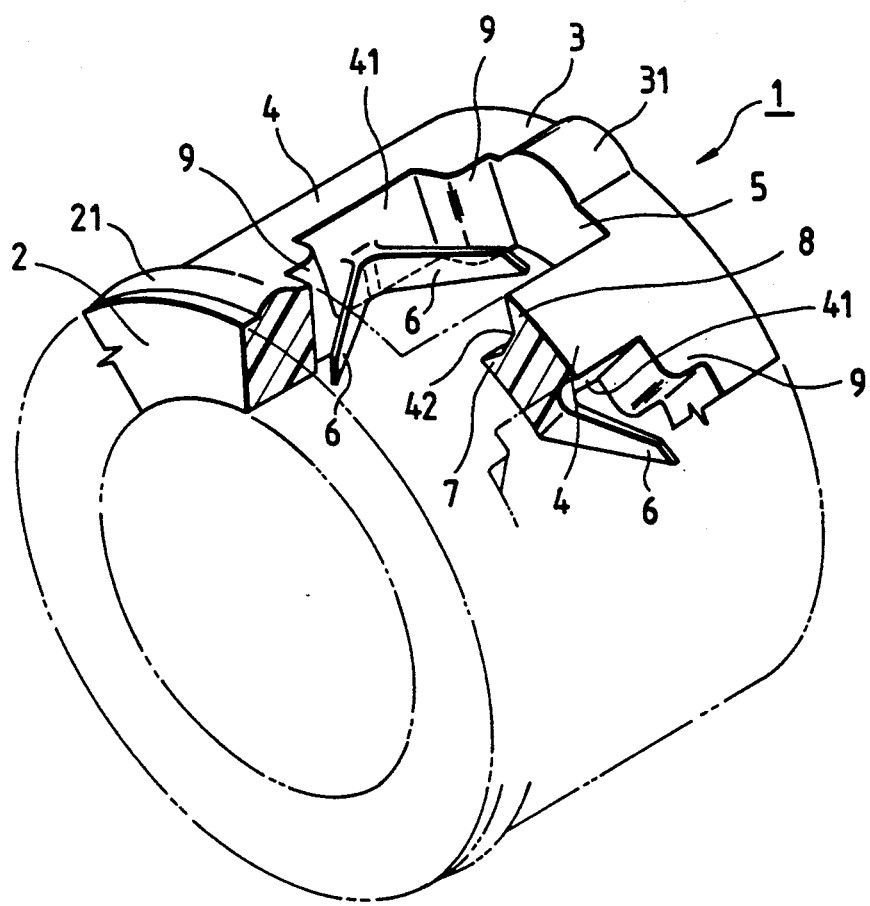
FIG. 1 is a perspective partial view of the preferred embodiment of the retainer of the present invention.
Figure 2:
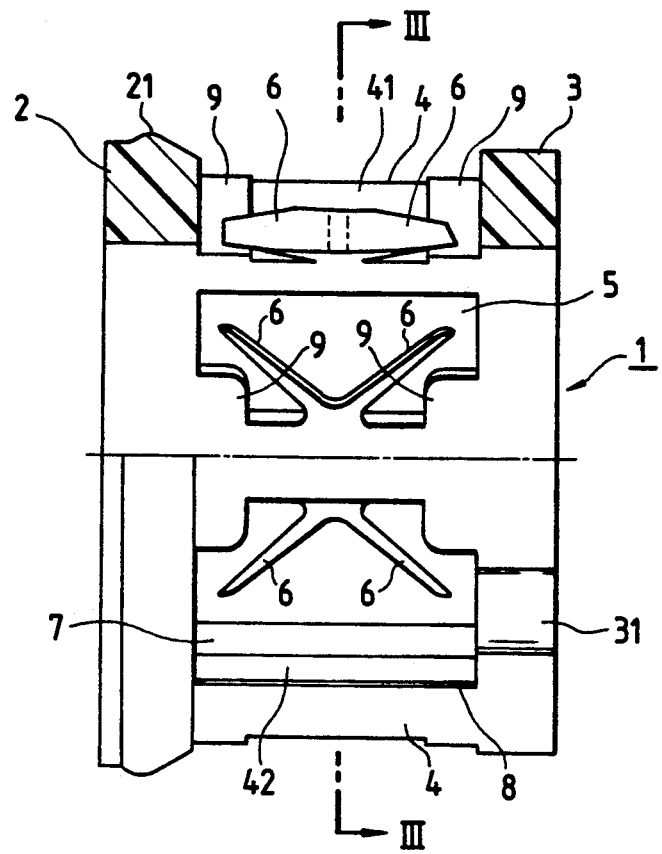
FIG. 2 is a longitudinally-sectional partial view of the retainer.
Figure 3:
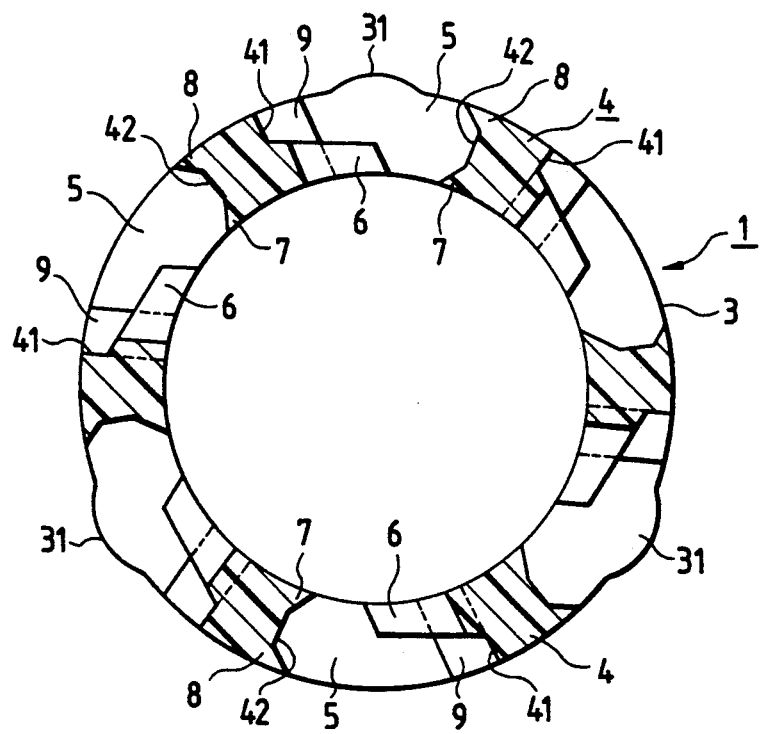
FIG. 3 is a cross-sectional view of the retainer along a line III—III shown in FIG. 2.

As shown in FIGS. 1, 2 and 3, a retainer 1, which is for a one-way clutch and is the preferred embodiment, includes a pair of annular portions 2 and 3, and a plurality of parallel column portions 4 disposed at equal intervals along the circumference of the retainer and extending parallel to the axis of the retainer between the annular portions so that the annular portions are coupled to each other by the column portions and roller pockets 5 are defined by the annular portions and the adjacent column portions. The column portions 4 each have a first or front side 41, toward which a roller housed in the roller pocket 5 is moved when the one-way clutch is disengaged, and a second or rear side 42, toward which a roller housed in the other neighboring roller pocket is moved when the clutch is engaged, The retainer 1 also includes a pair of cantilever elastic finger members 6 having adjacent proximal ends with the fingers extending unitarily from front 41 of each column portion 4. The finger members 6 flare outwardly and extend in the form of V shape from their proximal ends. The width of each elastic finger member 6 gradually decreases from the proximal end thereof on the front 41 to the tip of the distal end of the elastic member. The tip of each elastic member 6 is made oblique in such a manner that the inner edge of the tip is sharper than the outer edge thereof. The annular portions 2 and 3, the column portions 4 and the elastic members 6 are integrally molded from a synthetic resin. The rear 42 of each column portion 4 has an inner projecting part 7 and an outer projecting part 8 which project toward the front 41 of the neighboring column portion and extend along the total length of the roller pocket 5. The cross section of each of the projecting parts 7 and 8 is nearly triangular. The front 41 of each column portion 4 has a pair of stops 9 which project as quadrangular pillars toward the rear 42 of the neighboring column portion 4 and extend along the total thickness of the former column portion in the radial direction of the retainer at both the ends of the roller pockets 5 so that the stops stop the elastically deformed tips of the elastic finger members 6 to limit the elastic deformation thereof toward the front of the column portion. The corner of each stop 9, with which the elastic finger member 6 comes into contact when it is elastically deformed toward the front 41 of the column portion 4, is roundly chamfered so that the stress caused in the elastic finger member having come into contact with the corner is reduced. The peripheral part of the annular portion 2 has a projection 21 endlessly extending along the circumference of the portion and having a convex cross section. The peripheral part of the other annular portion 3 has three projections 31 located at equal intervals along the circumference of the portion and having a nearly semicircular cross section.

Figure 4:
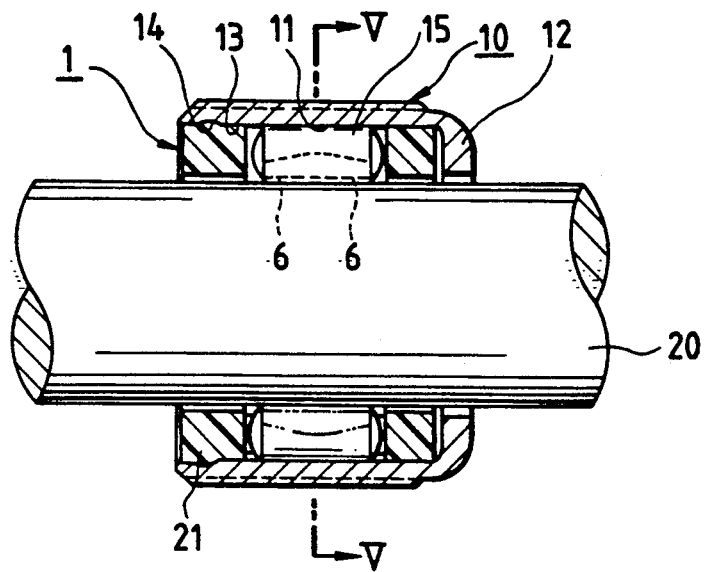
FIG. 4 is a longitudinally sectional view of a one-way clutch including the retainer.
Figure 5:
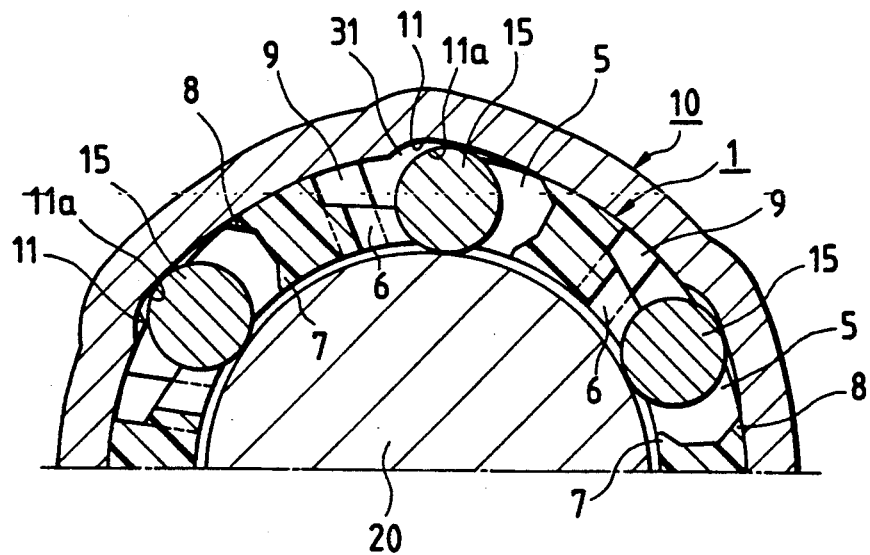
FIG. 5 is a cross-sectional partial view of the one-way clutch along a line V—V shown in FIG. 4.
Figure 6:
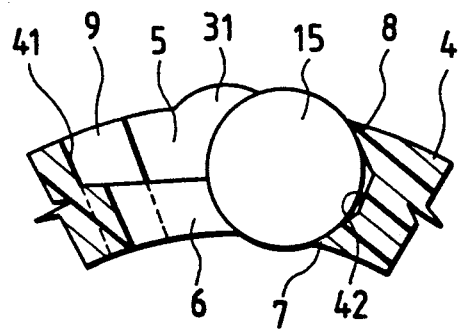
FIG. 6 is a cross-sectional partial view of the retainer retaining rollers.
Figure 7:
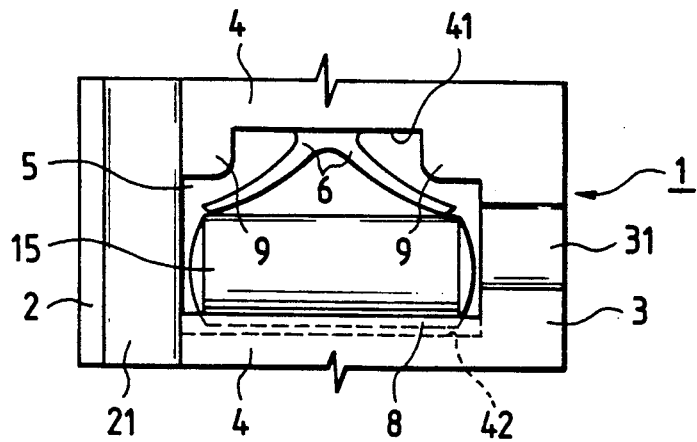
FIG. 7 is a partial developed view of the retainer retaining the rollers in the state of engagement of the one-way clutch.

FIGS. 4 and 5 show the one-way clutch including the retainer 1, a casing 10 made of a metal plate and a plurality of rollers 15. The inside circumferential surface of the casing 10 has six concavities 11 formed a camming surface 11a, the number of which is equal to that of the roller pockets 5 of the retainer 1. The rollers 15 are rotatably retained in the roller pockets 5. A shaft 20 is inserted through the retainer 1. The casing 10 includes an end portion 12 extending in the radial direction of the casing at one end thereof, and a cylindrical portion 13 extending in the axial direction of the casing at the other end thereof and not having the camming surfaces 11a of the concavities 11. The inside circumferential surface of the cylindrical portion 13 has a circumferential groove 14 endlessly extending along the circumference of the casing 10. The projection 21 of the annular portion 2 of the retainer 1 is fitted in the circumferential groove 14 so that the retainer and the casing 10 are prevented from separating from each other in the axial direction thereof. The three projections 31 of the other annular portion 3 of the retainer 1 are fitted in alternate ones of the six concavities 11 of the casing 10 so that the retainer and the casing are prevented from rotating relative to each other in the circumferential direction of the one-way clutch. The constitution of the casing 10 and the fitting of the projections 31 of the annular portion 3 of the retainer 1 in the casing were disclosed in the U.S. Pat. No. 4,566,567 granted to the present applicant.

The procedure of assembling the one-way clutch will now be described. The rollers 15 are first put in the roller pockets 5 of the retainer 1 from outside the pockets in the radial direction of the retainer. As a result, the peripheral surfaces of the rollers 15 are brought into contact with the tips of the elastic finger members 6 so that the tips are elastically deformed slightly toward the fronts 41 of the column portions 4, and the elastic reaction forces of the elastic finger members 6 push the rollers toward the rear portions 42 of the column portions to put the peripheral surfaces of the rollers in contact with the projecting parts 7 and 8. The rollers 15 are thus pinched at the about 180-degree mutually opposite portions of the peripheral surfaces thereof by the elastic finger members 6 and the projecting parts 7 and 8 so that the rollers are prevented from going out of the roller pockets 5 either inward or outward in the radial direction of the retainer 1. The retainer 1 is thereafter pushed into the casing 10 at the cylindrical portion 13 thereof and the projections 31 of the annular portion 3 of the retainer are located to move into alternate ones of the concavities 11 of the casing. As a result, the retainer 1 is housed in the casing 10 unrotatably relative thereto, and the projection 21 of the other annular portion 2 of the retainer is fitted in the circumferential groove 14 of the cylindrical portion 13 of the casing so that the retainer and the casing are prevented from separating from each other in the axial direction of the one-way clutch. The assembly of the clutch is thus completed.

The shaft 20 is thereafter inserted through the retainer 1 so that the peripheral surface of the shaft is put in contact with the rollers 15. When the shaft 20 is then rotated clockwise with regard to FIG. 5, the rollers 15 are rolled to the camming surfaces 11a of the concavities 11 of the casing 10 by not only the rotating force of the shaft but also the elastic finger restoring forces of the elastic members 6 so that the rollers become unrotatably pinched between the shaft and the camming surfaces due to a wedge effect. As a result, the shaft 20 and the casing 10 are rotated together. When the shaft 20 is rotated counterclockwise with regard to FIG. 5, the rollers 15 are rolled to the concavities 11 of the casing 10 while elastically deforming the elastic finger members 6 toward the fronts 41 of the bridges 4, so that the rollers become freely rotatable between the shaft and the concavities. As a result, the casing is not rotated and only the shaft is rotated.

Figure 8:
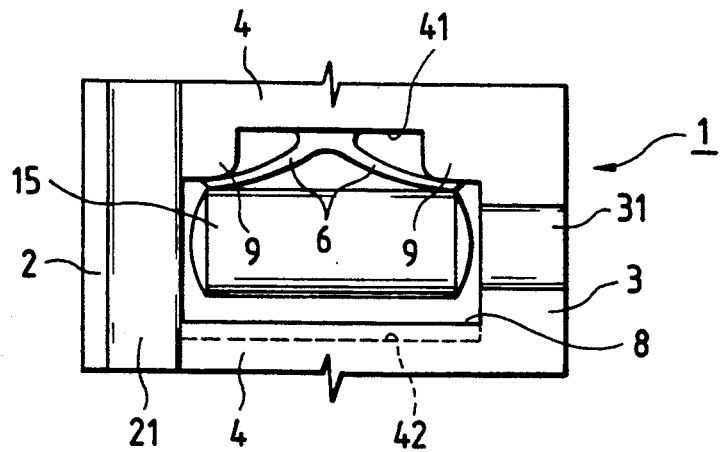
FIG. 8 is a partial developed view of the retainer retaining the rollers in the state of disengagement of the one-way clutch.

When the rollers 15 have become freely rotatable between the shaft 20 and the concavities 11 as mentioned above, the elastic finger members 6 are elastically deformed toward the fronts 41 of the column portions 4 and stopped by the stop 9 on the fronts so that the elastic finger deformation of the elastic members is limited, as shown in FIG. 8. Besides, since the width of each elastic member 6 decreases gradually from the proximal end of the elastic finger member toward the distal tip thereof and the distal tip is put in line contact or surface contact with the roller 15 to reduce the pressure on the elastic member to diminish the stress thereof, the plastic deformation of the member is avoided for a long period of time even is the engagement and disengagement of the one-way clutch are frequently repeated.

Since the constitution of the retainer 1 is sampler than the conventional retainer, molding dies for manufacturing the retainer from the synthetic resin can be more easily processed than those for the conventional retainer and do not need to be separated from the molded retainer so carefully as those for the conventional retainer. Therefore, the process and equipment for manufacturing the retainer 1 can be made more easily and with less expense than those for the conventional retainer.

The present invention is not confined to the above-described embodiment, but may be embodied or practiced in other various ways without departing from the spirit or essential character thereof.

What is claimed is:

1. A retainer for a one-way clutch, said retainer being made of a synthetic resin and including a pair of axially spaced annular portions having a circular periphery and a plurality of parallel column portions each having first and second sides, said annular portions and said column portions being integrally molded from said resin and cooperating to define roller pockets between adjacent column portions, said column portions extending between and coupling said annular portions to each other and being disposed at equal angular intervals along the circular periphery of said annular portions, and, two elastic finger members integrally extending into a roller pocket in cantilever manner from adjacent proximal ends at said first side of each of said column portions and flaring outwardly to terminate at spaced distal ends, said distal ends of said elastic finger members being positioned to engage a roller in the roller pocket to urge the engaged roller toward the second side of a second column defining a second side of the roller pocket, said second side of each of said column portions including an inner projecting part and an outer projecting part projecting toward the first side of the next adjacent column portion; wherein the width of each of said elastic finger members gradually decreases from the proximal end thereof toward the distal tip thereof; and wherein the first side of each of said column portions includes stops for limiting the elastic deformation of said elastic finger members toward said first side.

2. A retainer according to claim 1, wherein said elastic finger members extend in the form of a V from their proximal ends on a central part of the first side of each of the column portions.

3. A retainer according to claim 1, wherein one of the annular portions has an annular outer surface and a projection extending outwardly along the circumference of said annular outer surface.

4. A retainer according to claim 1, wherein the stops formed on the first side of each of the column portions project toward the second side of the next adjacent column portion at both the ends of said roller pocket.

5. A retainer according to claim 4, wherein each of said stops comprises a quadrangular pillar.

6. A retainer according to claim 5, wherein each of said stops has a rounded corner portion with which the elastic finger members are moved into contact in response to movement of said roller toward said first side of the column portion.

* * * * *